No. 815,370. PATENTED MAR. 20, 1906.
F. J. MURMANN & A. B. SHREVE.
SAFETY EQUIPMENT FOR SERIES ELECTRICAL DISTRIBUTION SYSTEMS.
APPLICATION FILED MAY 2, 1904.

2 SHEETS—SHEET 1.

WITNESSES:

INVENTORS
Fred J. Murmann
Albert B. Shreve
BY
Edward P. Thompson
ATTORNEY

UNITED STATES PATENT OFFICE.

FREDERICK J. MURMANN AND ALBERT B. SHREVE, OF MOUNT VERNON, NEW YORK.

SAFETY EQUIPMENT FOR SERIES ELECTRICAL DISTRIBUTION SYSTEMS.

No. 815,370.     Specification of Letters Patent.     Patented March 20, 1906.

Application filed May 2, 1904. Serial No. 205,960.

*To all whom it may concern:*

Be it known that we, FREDERICK J. MURMANN and ALBERT B. SHREVE, citizens of the United States of America, and residents of Mount Vernon, in the county of Westchester and State of New York, have invented certain new and useful Improvements in Safety Equipments for Series Electrical Distribution Systems, of which the following is a specification.

Our invention relates to a safety equipment for a series electrical distribution of light, heat, or power. It provides means for automatically and electrically disconnecting any circuit or any part of any circuit in which an open circuit may occur through any cause in a loop of the system and keeping the remainder of the loops in uninterrupted operation.

The objects of our invention are to automatically insure absolute safety to life and property of all kinds whatsoever in the event of the rupture of any series electrical circuit having impressed on it a potential capable of injuring life or property, to automatically insure uninterrupted operation to all other parts of the series circuit or system not protected by our invention, and to facilitate the repair of said rupture.

Accordingly our invention consists of an electric generator, circuit-loops, translating devices arranged in series with one another in said loops, all of said loops being in a normally-closed series circuit with said generator, and means both for making any loop dead upon the rupture thereof and for maintaining alive the other loops, said means consisting of an electromagnetic circuit-controller in conjunction with a spark-gap device adjusted to transmit a current to said controller when said rupture occurs.

The organization is set forth in the accompanying drawings and following description thereof.

Figure 1:
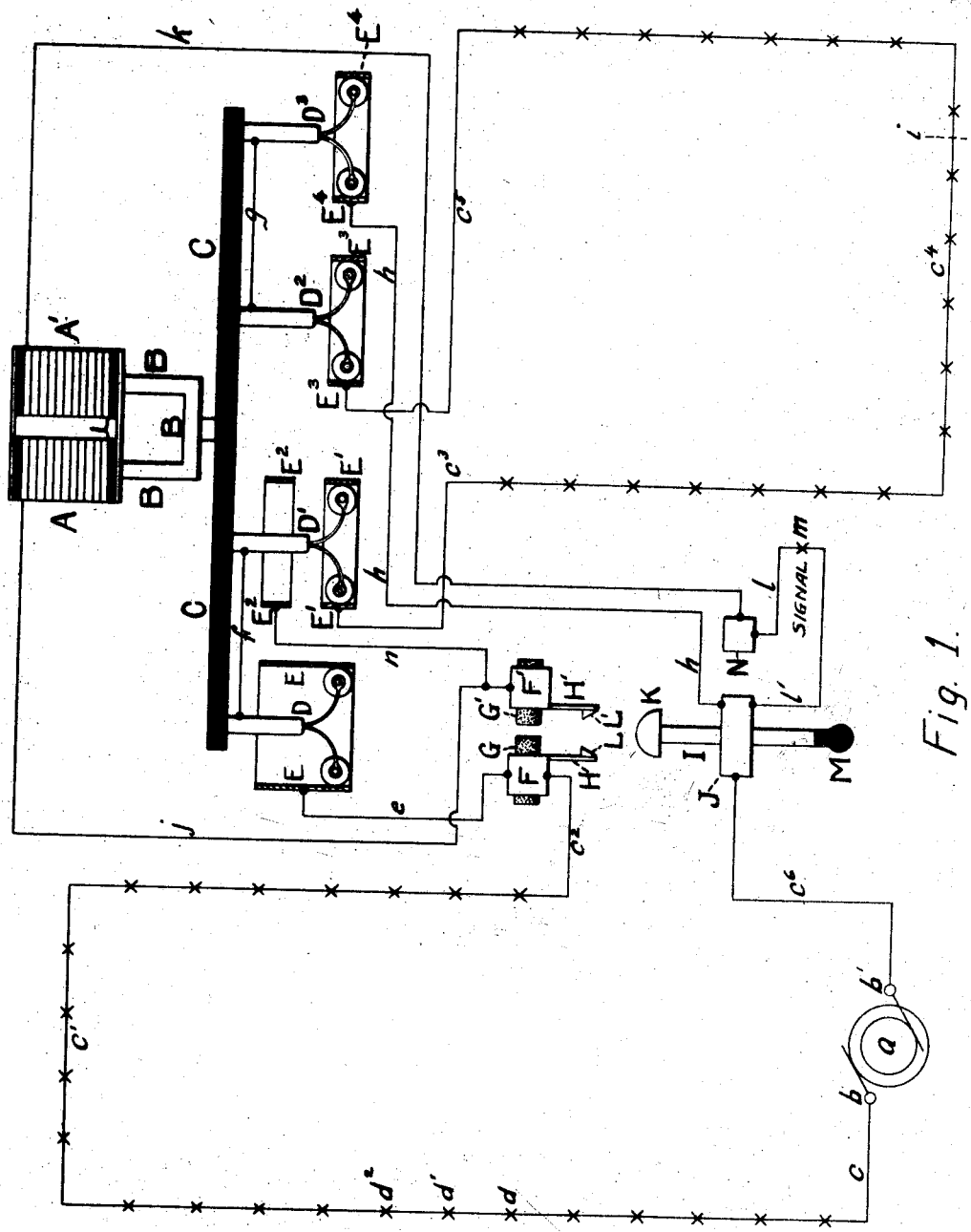
Figure 2:
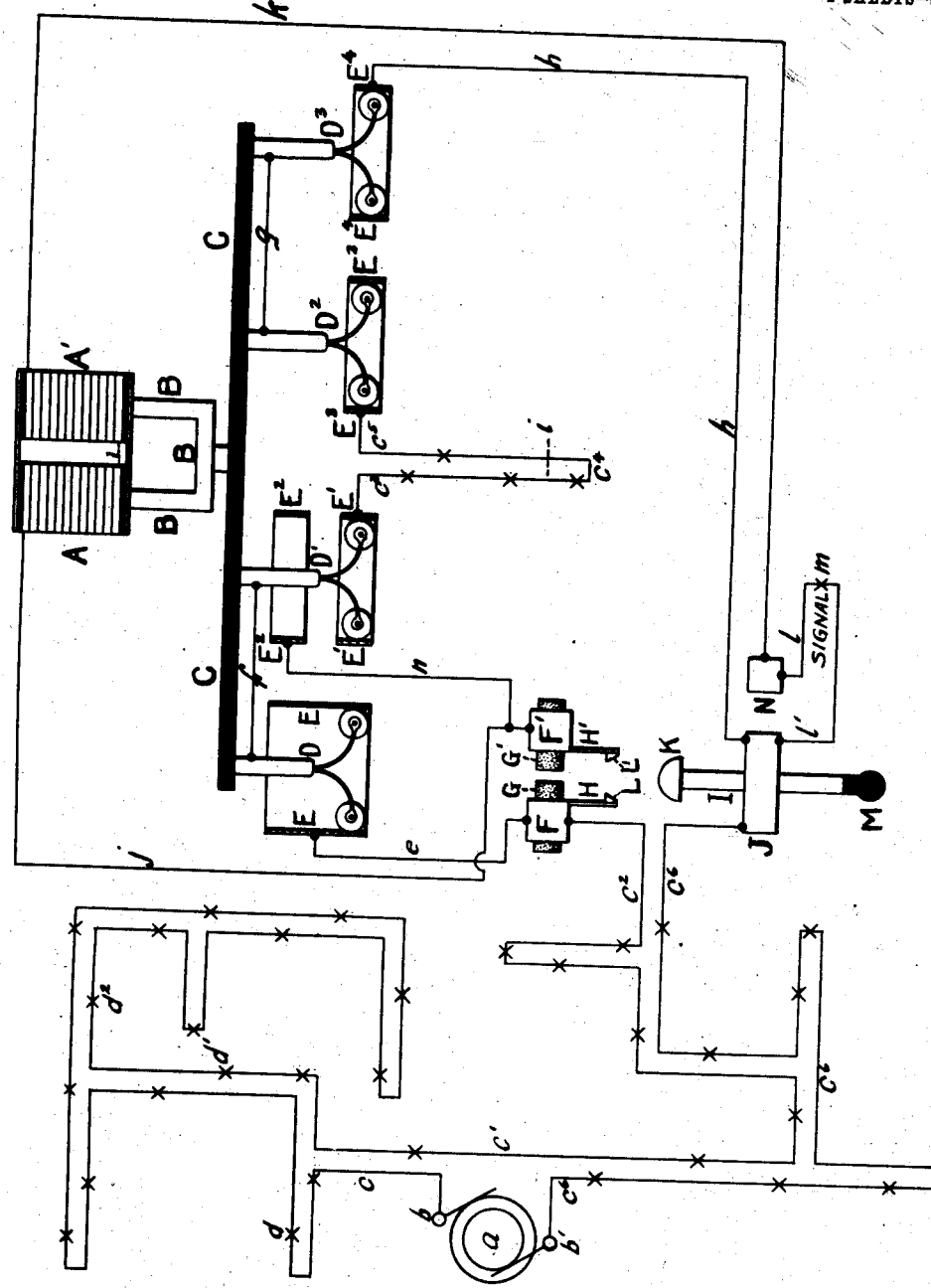

Figure 1 is a view, partly in diagram, of a complete series system of electrical distribution in so far as our invention is concerned, showing the system in normal operation through an automatic cut-out, which is installed in the central station and protecting one of the two circuits comprising the system. Fig. 2 is a similar view, partly in diagram, of our device installed outside the station in a loop of a series circuit and shown in normal operation.

The devices embodying our invention consist, essentially, of an electromagnet A A', having laminated iron core B B B arranged to slide in and out of the coils of the magnet. Attached to the lower end of the core or armature B B B is a bar of insulating material C C, carrying the contact-making devices D, D', $D^2$, and $D^3$ of four rectangular plunger-switches, (shown in section at E, E', $E^2$, $E^3$, and $E^4$.)

F and F' are two metal binding-posts fitted to receive each a carbon rod G and G', respectively, which carbon rods may be adjusted to form between their adjacent ends a spark-gap of the length that can be bridged by the electromotive force of the current in the main line. Attached to and in electrical connection with the terminals F and F' are two spring-clips (shown at H and H', respectively) which, together with the metal rod I, sliding through the binding-post J as guide, form a three-pole switch. The metal rod I and the spring-clips H and H' are all fitted with contact-pieces of a non-arcing conducting material, (shown at K L, respectively.) The metal rod I is fitted at its other end with an insulating-handle M.

N is a binding-post.

At *a* in both Figs. 1 and 2 is represented a source of electromotive force as a generator having terminals *b* and *b'*, to which are connected the line-wires *c* and $c^6$ of a series circuit $c$ $c'$ $c^2$ $c^3$ $c^4$ $c^5$ $c^6$.

The operation of our invention in protecting life and property endangered by a series electrical circuit and in keeping the remainder of the system in uninterrupted operation is as follows: The action is identically the same whether the current flows from the source of supply around the circuit in one direction or the other or alternately in one direction and then the other, as does an alternating current. However, for the sake of simplicity suppose the current to flow from the source *a* through the terminal *b* to the line-wire *c*, through the translating devices shown by crosses, as at *d* *d'* $d^2$, to the binding-post F of our cut-out. From here it finds an all-metallic path through the conductor $e$, contact-piece E E, roller-contact device D, conductor $f$, roller-contact device D′, contact-piece E′ E′ to the line-wire $c^3$ $c^4$ $c^5$, including the translating devices shown by crosses, which our invention is protecting, through contact-piece $E^3$ $E^3$, roller-contact device $D^2$, conductor $g$, roller-contact device $D^3$, contact-piece $E^4$ $E^4$, conductor $h$, binding-post J, conductor $c^6$, back to the source of supply $a$ by means of the terminal $b'$. Suppose now a break occurs in the line, as at the point $i$. The current can now no longer pass through the circuit just described; but if the air-gap between the carbons G and G′ were bridged the current flowing from terminal $b$ of the source of supply $a$ would pass to the terminal F, as previously described, and from terminal F through terminal F′, conductor $j$, magnet A A′, conductor $k$, terminal N, circuit $l$ $l'$, in which is the signaling device $m$, to the terminal J and back to the source of supply $a$. This is exactly what happens immediately on the occurrence of a break in the circuit $c^3$ $c^4$ $c^5$, the carbons G and G′ having been previously adjusted so that the electromotive force of the supply $a$ will be able to jump this gap. The result of the current taking this new path is twofold. It energizes the magnet A A′, which is of such a strength as to immediately draw its core B B B into itself, and it actuates the signaling device $m$. With the core B B B fully drawn into the magnet A A′, the roller-contact device D is still in contact with contact-piece E E, roller-contact device D′ is in contact with contact-piece $E^2$ $E^2$, roller-contact devices $D^2$ and $D^3$ are out of contact with $E^3$ $E^3$ and $E^4$ $E^4$, respectively. The result of the magnet's drawing its core into itself is twofold. Terminals F and F′ are short-circuited, thus stopping the arc between the carbons G and G′ and at the same time continuing the loop $c$ $c'$ $c^2$ in uninterrupted operation. By the raising of contact devices D′ and $D^2$ out of contact with E′ E′ and $E^3$ $E^3$, respectively, both poles or terminals $c^3$ and $c^5$ of the line $c^3$ $c^4$ $c^5$ are entirely disconnected from the source of supply $a$, thus rendering this portion $c^3$ $c^4$ $c^5$ of the series electrical system containing the open circuit shown at $i$ entirely dead and harmless. One may now search for the rupture and repair the break shown at $i$ without fear of injury from the source of supply $a$. The break having been repaired, the repairman goes to the cut-out and by means of the insulating-handle M raises the rod I and closes the three-pole switch whose terminals are F F′ and J, respectively. Doing this short-circuits the terminals F′ and N of the magnet and connects line-wire $c^3$ directly to conductor $c^6$, thereby continuing circuit $c$ $c'$ $c^2$ in uninterrupted operation. Short-circuiting the terminals of the magnet deënergizes it and causes it to drop its core with the contact devices D, D′, $D^2$, and $D^3$ connected thereto. The repairman now releases his hold of the handle M, and therefore the rod I by gravity drops out of contact with terminals F and F′. The contact devices D, D′, $D^2$, and $D^3$ drop to the lowest point of their travel in the position of normal operation, so that if there is no break in the line $c^3$ $c^4$ $c^5$ normal operation of this part of the system will be instantly resumed through the circuit and connections first described. If, however, the repairman has not repaired the break or if another break has occurred since the first one, then when the rod I is allowed to fall a spark will pass between the carbons G and G′, magnet A A′ will again draw up its core B B B, cutting the loop $c^3$ $c^4$ $c^5$ dead again and actuating the signaling device $m$.

The signaling device which has been referred to serves two purposes—viz., it calls the repairman's or station attendant's attention to the fact that a loop or a circuit, respectively, has been interrupted, and secondly, it indicates to all who understand it that the loop or circuit on which the device is placed is entirely disconnected from the source of supply $a$.

Taking another case, suppose that our device is installed on a series-lighting circuit and that the open circuit has not been found before the source of supply is shut off in the morning. As soon as said source of supply $a$ is shut off magnet A A′ is deënergized and drops the contact devices D, D′, $D^2$, and $D^3$ into the position of normal operation. The circuit as a whole or in part can now be tested for the open circuit with a magneto, the current furnished by the magneto not being sufficient to actuate the magnet A A′.

The foregoing description applies equally to both Fig. 1 and Fig. 2, the only difference being that Fig. 1 represents our cut-out installed at a central station and protecting a whole circuit, while Fig. 2 represents our cut-out as being installed on the pole-line outside of the station and protecting one of the loops of a series circuit.

In practice one cut-out would be installed on each series circuit, leaving the station and as many more out on the line as desired.

The term "generator" stands for any similar device—such as, for example, a secondary generator.

Having described our invention, what we claim as new, and desire to secure by Letters Patent, is—

1. In a series system of electrical distribution, the combination of an electric generator, a main line in circuit therewith, a cut-out in circuit with said main line, means, in an open circuit with said generator for automatically actuating said cut-out in the event of a rupture at any point of that portion of the circuit having the rupture, and a three-pole manually-operative switch for short-circuiting said means, and for closing the circuit of the main line extending from said electric generator.

2. In a system of electrical distribution, the combination of an electric generator, circuit-loops, translating devices arranged in series with one another in said loops, all of said loops being in a normally closed series circuit with said generator, and means both for making any loop dead upon the rupture thereof, and for maintaining alive the other loops, said means consisting of an electromagnetic circuit-controller in conjunction with a spark-gap device adjusted to transmit a current to said controller when said rupture occurs.

3. In a series system of electrical distribution, the combination of an electric generator, two or more main-line loops in series circuit with said generator, contact-terminals normally in series circuit with said loops and generator, and automatic means for electrically separating said contact-terminals from one loop consisting of an electromagnetic cut-out and a spark-gap device governing said cut-out, and adjusted to be operative by the electromotive force of the current in the main line during a rupture.

4. In a system of electrical distribution, the combination of an electric generator, circuit-loops, translating devices arranged in series with one another, in said loops, all of said loops being in a normally closed series circuit with said generator, means both for making any loop dead upon the rupture thereof, and for maintaining alive the other loops, said means consisting of a spark-gap device for transmitting a momentary current upon the occurrence of said rupture, a magnet in series with said device, and cut-outs controlled by said magnet for interrupting both terminals of the ruptured loop.

5. In a system of electrical distribution, the combination of an electric generator, circuit-loops, translating devices arranged in series with one another, in said loops, all of said loops being in a normally closed series circuit with said generator, means both for making any loop dead upon the rupture thereof, and for maintaining alive the other loops, said means consisting of a spark-gap device for transmitting a momentary current upon the occurrence of said rupture, a magnet in series with said device, cut-outs controlled by said magnet for interrupting both terminals of the ruptured loop, and means controlled by said magnet for short-circuiting said device.

6. In a series system of electrical distribution, the combination of an electric generator, two or more main-line loops in series circuit with said generator, contact-terminals normally in series circuit with said generator, contact-terminals normally in series circuit with said loops and generator, automatic means for electrically separating said contact-terminals from the main-line terminals, consisting of an electromagnetic cut-out, and a spark-gap device governing said cut-out, and adjusted to be operative by the electromotive force of the current in the main line during a rupture, and a circuit-closer controlled by the magnet of said magnetic cut-out for maintaining a current through said magnet after the operation of said spark device.

7. In a series system of electrical distribution, the combination of an electric generator, a main line having loops in series circuit with the generator and each other, contact-terminals normally in series circuit with said loops and generator, automatic means for electrically separating said contact-terminals from said main-line terminals upon the rupture of one of the loops at any point therein, for protecting life and property along said main line from the possibility of injury by a current from said generator, said means consisting of an electromagnetic cut-out, and a spark-gap device governing said cut-out, and adjusted to be operative by the electromotive force of the current in the main line, during said rupture, a circuit-closer controlled by the magnet of said magnetic cut-out for maintaining a current through said magnet after the operation of said spark device, and a manual switch for short-circuiting said magnet and for closing the main line.

8. In a series system of electrical distribution the combination of an electromagnet, a movable core therefor, a bar of insulating material attached to the core, contact devices D, D', D², D³, carried by said insulating material, four corresponding contacts E, E', E³, E⁴, for said devices, metal binding-posts F, and F', carbon rods G, and G', respectively fitting in the posts, and adjustable to form between their adjacent ends a spark-gap that can be bridged by the electromotive force of the current in the main line, spring-clips H, and H', in electrical connection respectively with the terminals F and F', a metal rod I, binding-post J, acting as a guide for the rod I, which clips together with said rod and post form a three-pole switch, an electric generator having terminals, to which are connected the line-wires $c$ and $c^6$ of a series circuit $c, c'$, to $c^6$, translating devices, in said circuit which is normally closed through the generator, the line-wire $c$, the translating devices, contact devices E, D, D', E', to a portion of the main-line circuit $c^3, c^4, c^5$, contact devices E³, D², D³, E⁴, and back to the generator, the air-gap being bridged upon the rupture of the line $c^3$, $c^4$, $c^5$, and the said magnet being thereby included in circuit, for operating its core and thereby short-circuiting and stopping the arc between the carbon rods G, and G', and raising the contact devices D', D², out of contact with the devices E', and E³, for cutting out both poles of the line $c^3$, $c^4$, $c^5$, from the generator, the circuits and contacts being so arranged that said magnet is cut out of circuit with the generator only upon the closing of the three-pole switch, a contact E², in the path of the contact D', for serving the purpose of short-circuiting the rods G, and G', when the magnet is energized for raising said contact devices, and a conductor $f$, for connecting the pair of contact devices D, and D', to form an electric connection between the devices D, and D', when the latter device touches the contact E².

9. In a system of electrical distribution, the combination of an electric generator, circuit-loops, translating devices arranged in series with one another in each loop, all of said loops being in a normally closed series circuit with said generator, and means both for making any loop dead only upon the rupture thereof, and for maintaining alive the other loops.

10. In a system of electrical distribution, the combination of an electric generator, circuit-loops in a normally closed series circuit with said generator, translating devices in series circuit in said loops, means for making any loop dead only upon the rupture thereof and for maintaining the other loops alive, and a solely manual device for making said ruptured loop alive again.

11. In a system of electrical distribution, the combination of an electric generator, circuit-loops in series with said generator and with each other, translating devices arranged in series circuit in said loops, means for making any loop dead only upon rupture thereof, and simultaneously making the rest of the loops alive, and means for invariably maintaining said dead loop dead during all the time that the break in the loop exists and until the same is repaired and both poles of the loop are included in circuit with said generator.

12. In a system of electrical distribution, the combination of an electric generator, translating devices in series circuit therewith, means actuated by the electromotive force produced by the rupture of the series circuit, for cutting off the circuit from both poles of said generator, means for holding said circuit so cut off, and a manual device for connecting said circuit again to the respective poles of said generator

FRED. J. MURMANN. [L. S.]
ALBERT B. SHREVE [L. S.]

Witnesses:
WILLIAM C. DOULE,
RALPH S. GRISWOLD